(12) United States Patent
Sefton et al.

(10) Patent No.: US 8,178,016 B2
(45) Date of Patent: May 15, 2012

(54) METHOD FOR MANUFACTURING A MULTILAYERED COMPOSITE MOLDED PART

(75) Inventors: Robert H. Sefton, Bradford, PA (US); Jochen Werz, Oberstenfeld (DE); Alan Ramsey, Emporium, PA (US); Martin Dietz, Mainhardt (DE)

(73) Assignee: Werzalit GmbH + Co. KG, Oberstenfeld (DE)

( * ) Notice: Subject to any disclaimer, the term of this patent is extended or adjusted under 35 U.S.C. 154(b) by 1020 days.

(21) Appl. No.: 12/129,692

(22) Filed: May 30, 2008

(65) Prior Publication Data

US 2008/0318006 A1    Dec. 25, 2008

Related U.S. Application Data

(60) Provisional application No. 60/940,972, filed on May 31, 2007.

(51) Int. Cl.
*B29C 43/18*    (2006.01)
(52) U.S. Cl. .................................. 264/113; 264/112
(58) Field of Classification Search ............ 264/113
See application file for complete search history.

(56) References Cited

U.S. PATENT DOCUMENTS

| | | | | |
|---|---|---|---|---|
| 3,843,431 A | * | 10/1974 | Dostalik | 156/62.2 |
| 3,846,219 A | * | 11/1974 | Kunz | 428/165 |
| 5,435,954 A | * | 7/1995 | Wold | 264/115 |
| 5,648,154 A | * | 7/1997 | Koh et al. | 428/313.7 |
| 5,759,463 A | * | 6/1998 | Chang | 264/112 |
| 6,238,199 B1 | | 5/2001 | Schallenmueller et al. | |
| 7,422,787 B2 | * | 9/2008 | Evers et al. | 428/292.4 |
| 2006/0177648 A1 | * | 8/2006 | Isaksson et al. | 428/326 |
| 2008/0042313 A1 | * | 2/2008 | Moeller | 264/113 |

FOREIGN PATENT DOCUMENTS

| | | |
|---|---|---|
| DE | 4430528 A1 | 2/1996 |
| EP | 0956936 A1 | 11/1999 |
| WO | 02/074509 A1 | 9/2002 |

* cited by examiner

*Primary Examiner* — Mary F Theisen
(74) *Attorney, Agent, or Firm* — Perkins Coie LLP; Aaron Wininger

(57) ABSTRACT

A method for manufacturing a multilayered composite molded part in a pressing tool, comprises: for a lower layer, particles provided with binder are poured into a mold in a lower part of the pressing tool; a pre-pressed molded part, which has coarser particles than those of the lower layer, is inserted into the first layer; the layers are compressed together with the pre-pressed, inserted molded part under the influence of pressure and heat so as to form the multilayered composite molded part, via the inserted molded part corresponding to the lower layer by means of an upper part of the pressing tool which is guided onto the upper layer. A product manufactured thereby has the form of a multilayered composite molded part with high strength and finely structured outer surfaces or layers and combines within it advantages of various conventional individual products.

10 Claims, 4 Drawing Sheets

METHOD FOR MANUFACTURING A MULTILAYERED COMPOSITE MOLDED PART

CROSS REFERENCE TO RELATED APPLICATIONS

This application claims priority to and incorporates by reference U.S. Patent Application No. 60/940,972 filed May 31, 2007.

FIELD OF THE INVENTION

The invention relates to a method for manufacturing a multilayered composite molded part and also to a composite molded part manufactured using this method.

BACKGROUND

Methods for manufacturing molded parts, which consist in particular of a non-flowable mixture of chip and/or fiber materials and heat-hardenable binders and are pressed in a pressing tool under pressure and supplied heat, are widely known. The Applicant itself has disclosed solutions for this purpose in a plurality of patent applications. Examples include DE 44 305 28 A1 which comprehensively discloses a method and a device for manufacturing molded parts. Furthermore, EP 0956936 A1 discloses, in particular, the design of a multipurpose press for the manufacture of molded parts.

Accordingly, in the prior art, molded parts made of small particles, such as for example wood chips and other cellulose-containing fibers, are manufactured in pressing tools configured accordingly for this purpose. Unfortunately, the achievable strengths of the molded parts are limited by the relatively short length of the particles or wood chips used. This applies, in particular, to the modulus of elasticity. Also, the fracture behavior of molded parts of this type is rather disadvantageous, as the molded parts can break with short fibers and also sharp edges or in a brittle manner. On the other hand, molded parts of this type, which are made of small particles, are particularly advantageous with regard to their uniform and smooth surface. The reason for this is that the molded parts can if necessary also be painted or else structured, for example be provided with pores. Furthermore, differing wall thicknesses can also be produced.

In addition to three-dimensional molded parts made of fine particles, parts of this type in the form of boards are also known. These are, for example, boards comprising crushed wood particles, such as for example chip boards or medium-density fiber boards known as MDF boards for short. In this case too, only limited strength, in particular bending strength and modulus of elasticity, can be achieved. This greatly restricts the use of boards of this type in cases in which stringent demands are placed on strength, or the use thereof as supporting parts.

Therefore, large particles or chips are also used for the manufacture of boards or molded parts. These are, in particular, relatively elongate wood chips, known as strands, such as are described for example in WO 02/074509 A1. The molded parts produced therefrom have relatively high strengths, in particular high moduli of elasticity. They also break resiliently without leaving excessively sharp break edges. Furthermore, these molded parts have relatively low density. Their surface structure is, however, disadvantageous because the large particles or chips are evident on the surface. Direct coating, structuring or painting of molded parts of this type is very difficult or even impossible.

Furthermore, multilayered board-like materials made of plywood or laminated wood or molded parts derived therefrom are also known. In these molded parts, thin veneer layers are coated one above the other and compressed in tools. In the veneer itself the mature wood structure is maintained, thus allowing boards or molded parts having high strength and beneficial fracture behavior to be manufactured. Drawbacks of these boards and parts, however, include the relatively high price of the veneer to be used and the manufacturing process which is difficult to automate. For some years, substitute materials made of oversized wood chips, in particular the above-mentioned strands, have also been used instead of plywood. These are used to produce, in particular, boards known as OSBs (OSB: oriented strand or structural board), i.e. boards containing oriented wood chips. These products have properties comparable to plywood. The process for manufacturing OSBs of this type is in this regard fully automatable.

The known methods therefore allow the manufacture of board-like or three-dimensional parts having high strength and low weight. Markedly deformed parts may also be manufactured, wherein the fracture behavior is more beneficial and, in particular, a high modulus of elasticity can be achieved. Known manufacturing methods using strands preferably utilize light types of wood (poplar, aspen, spruce). The wood is prepared using specific machines to form extensive, oversized wood chips. Subsequently, these chips are dried in continuous dryers to a defined wood moisture content of approximately 1%. Binders (pMDI, aminoplastics) are added in a drum gluing machine. In this case, the chip material must however be treated with care to avoid mechanical damage to the structure of the wood. The glued chips are then supplied to a flow forming machine with which a chip nonwoven is continuously scattered and mold boxes are thus filled. These mold boxes are then transferred manually to the pressing tools, where the chip nonwovens are deposited manually. The molded parts are hardened at a temperature of approx. 170° Celsius and a molding pressure of approx. 3 $N/mm^2$. This produces molded parts which have high strength and beneficial fracture behavior and also low weight.

Drawbacks, however, include the exclusively manual process control which renders large-scale production scarcely possible from a financial perspective. Furthermore, the uniform mold boxes which are used for differing molded part contours give rise to a high proportion of wastage which can be as much as 50% of the material used. Also, differing wall thicknesses cannot be achieved for a uniformly formed nonwoven.

In conclusion, it may therefore be stated that the prior art discloses a large number of different molded parts and boards which can be manufactured with one layer or else with a plurality of layers. However, these parts also have, depending on the composition of the material or of the respective layer, the above-mentioned negative properties. It would be desirable to provide a product which combines as many as possible of the positive properties in the form of a particular combination or of a new composite molded part. An effective and process-optimizable manufacturing method should, in particular, be proposed for this purpose.

SUMMARY

It is thus the object of the invention to propose a method for manufacturing composite molded parts that advantageously overcomes the aforementioned drawbacks. A molded part manufactured using this method should also be proposed.

The object may be achieved by a method and a multilayered composite molded part according to the embodiments disclosed herein.

Accordingly, a method for manufacturing a multilayered composite molded part is proposed in which, in a pressing tool having a lower part and an upper part, the following steps are carried out:

Firstly, for forming a lower layer, relatively fine particles provided with binders are poured into a mold in the lower part of the pressing tool. Then, in a subsequent step, a pre-pressed molded part, which contains coarser particles than the lower layer, is placed onto the lower layer. Afterwards, an upper layer is formed via the molded part resting on the lower layer in that, again, relatively fine particles provided with binder are poured on. Subsequently, the upper part of the pressing tool is guided onto the upper layer and the outer layers are compressed with the enclosed pre-pressed molded part under the influence of pressure and heat so as to form a multilayered composite molded part. The method can be adapted to various situations in a very flexible manner and can be modified for various product preferences.

There is thus manufactured a multilayered composite molded part which preferably has three layers, two outer layers (lower and upper layer) preferably containing the same fine particle and a central layer comprising coarser particles being provided in the center. This central layer is preferably formed by a pre-pressed molded part which is inserted into the mold and which is surrounded by the two outer layers. There is thus obtained a sandwich design in which the central layer has high strength owing to the large particles or chips which may, for example, be strands. The two outer layers have, again, a relatively uniform and smooth surface. The advantages of the respective layers or structures are thus combined in a new composite molded part. The proposed manufacturing method therefore provides a highly functional hybrid part which can be used or designed for a broad range of applications.

Preferably, a pre-pressed molded part is inserted as an OSB mat or the like during the manufacturing process. It may however also be a nonwoven comprising glued chips or the like. In this regard, the nonwoven is formed directly by means of a new device for filling into the pressing tool, allowing continuous process automation. This ensures both an appropriate metering rate and a uniform distribution of the glued chip into the cavity of the tool. This allows, inter alia, the proportion of wastage to be greatly reduced. In addition, differing wall thicknesses and marked deformation of the parts are possible. The invention is ideal for the application or use of native, light types of wood (poplar, aspen). In particular, use may be made of types of wood which are produced based on short rotation and which in the past have not been used extensively in the traditional timber industry.

In particular, the multilayered composite molded parts manufactured using the invention have higher strength, in particular a higher modulus of elasticity, than conventional molded parts.

They also have still further improved, beneficial fracture behavior. In addition, the parts have a beneficial ratio between weight and strength. The surface of the molded parts is smooth and closed and can easily be decorated. Furthermore, differing wall thicknesses are possible. The filling method can, for example, be carried out by means of a rotating screen basket. Large chips are preferably applied by means of a metering roller or by inserting the pre-pressed molded part.

BRIEF DESCRIPTION OF THE DRAWINGS

The invention will be described hereinafter in greater detail based on exemplary embodiments and with reference to the appended figures, in which.

DETAILED DESCRIPTION OF THE ILLUSTRATED EMBODIMENTS

Figure 1:
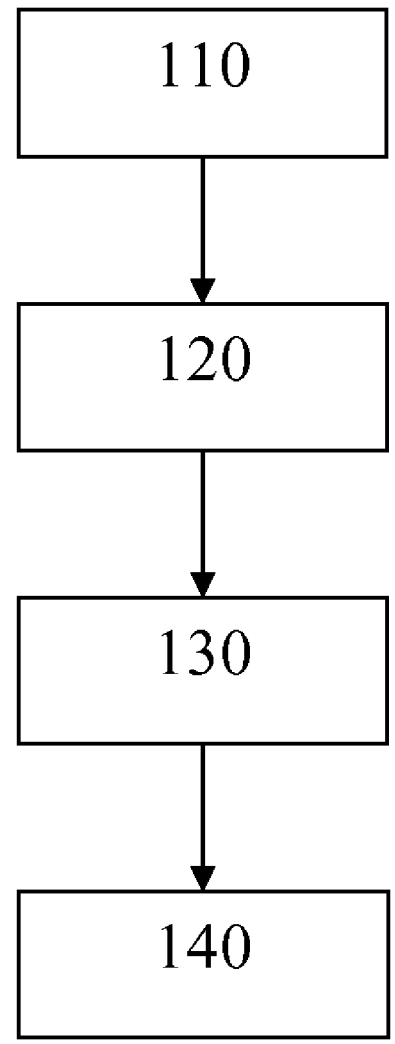
FIG. 1 is a schematic flow chart of a method according to the invention for manufacturing multilayered composite molded parts.
Figure 2:
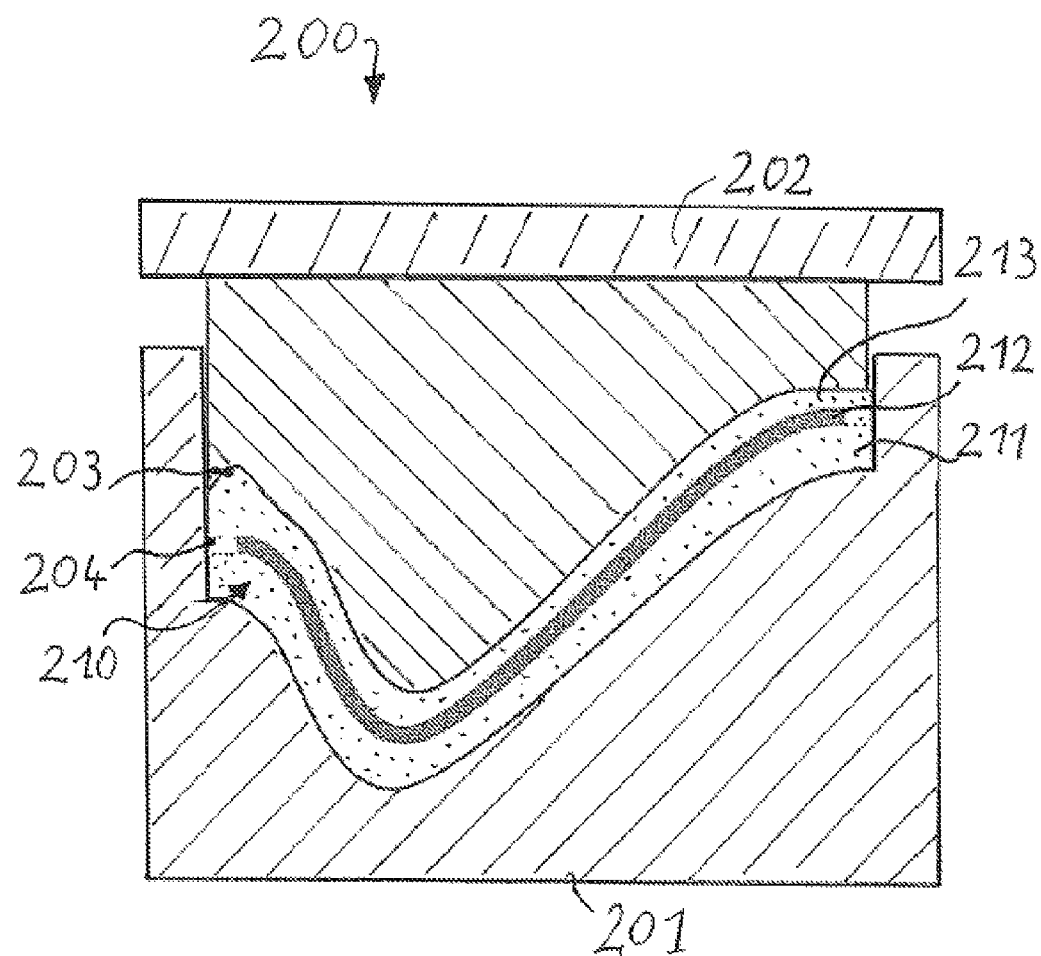
FIG. 2 is a schematic sectional drawing of the construction of the pressing tool with the finished pressed composite molded part located therein.
Figure 3A:
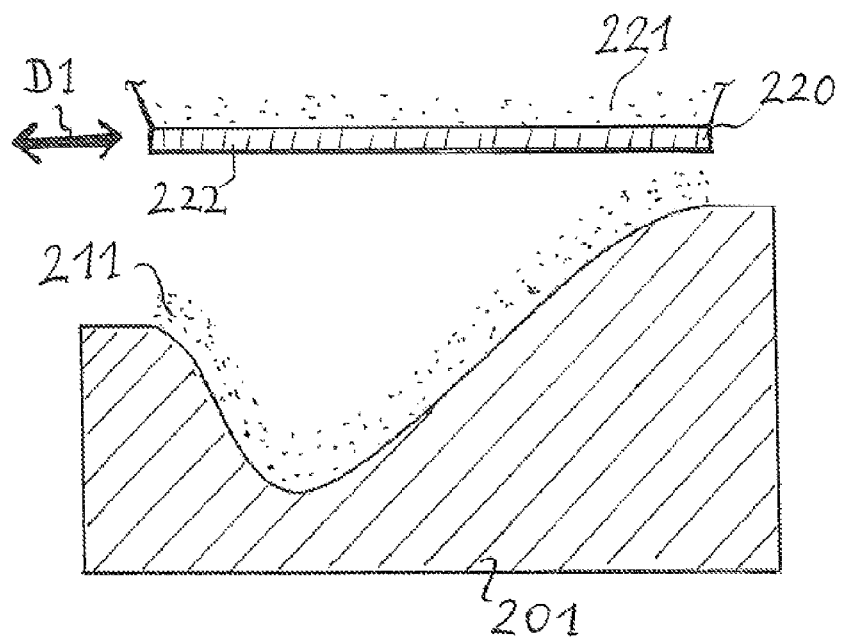
FIG. 3a, b, c show schematically in the form of snapshots the sequence of the basic manufacturing steps.
Figure 3B:
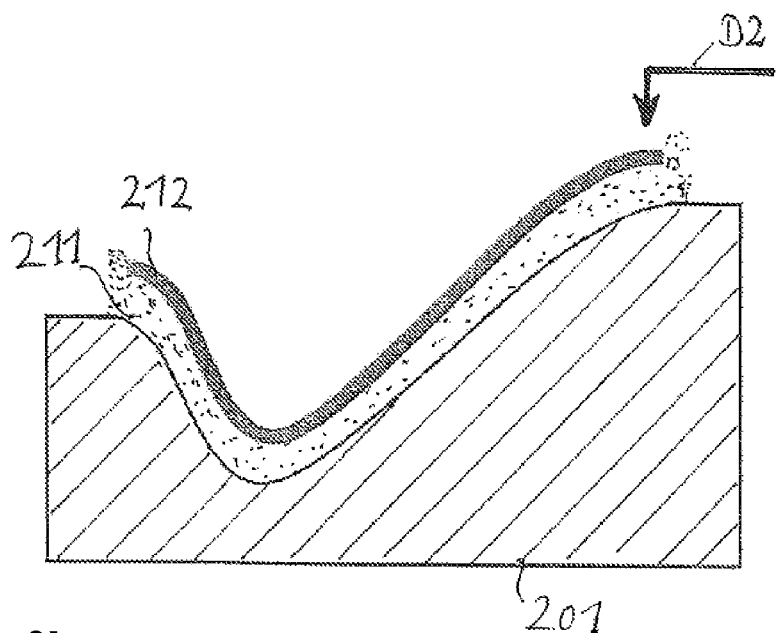
Figure 3C:
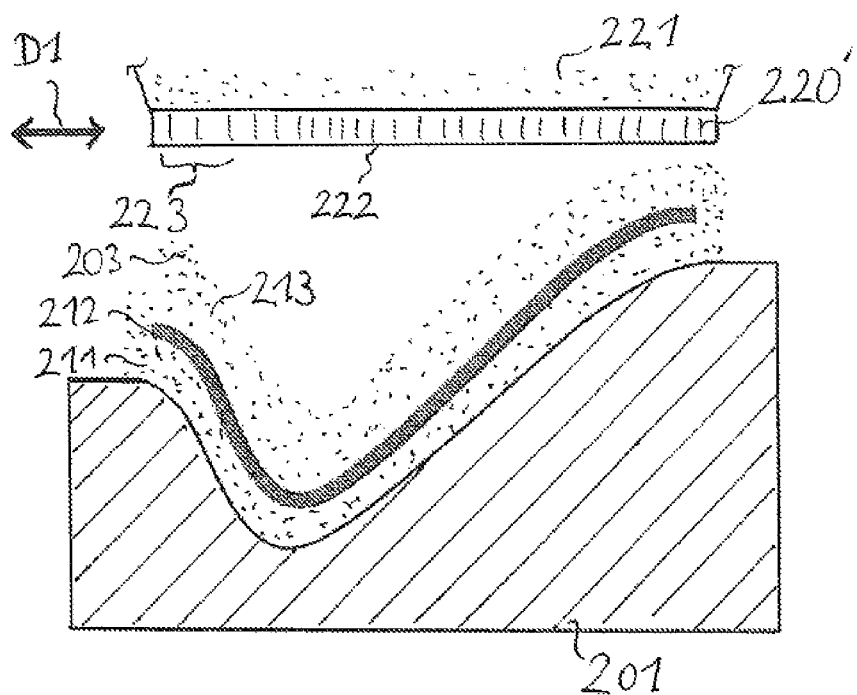

FIG. 1 is a schematic sequence diagram of a method 100 according to the invention for manufacturing a composite molded part within a press, such as is shown by way of example in FIG. 2 and will be illustrated in greater detail with reference to FIG. 3a to 3c. Reference will therefore equally be made hereinafter to these figures:

The method 100 commences with a first step 110 (see also FIG. 3a) in which, for forming a first layer 211 of the multilayered molded part 210 to be pressed, a filling material or mixture of binder and relatively fine particles is poured into the mold of the pressing tool lower part 201. This is carried out preferably by a filling means having a shaking screen 220 which is supplied from one side or direction D1 and is shaken via the pressing tool lower part 201. The screen 220 was filled beforehand with the filling material or mixture from above via a filling means 211 or filling box (only indicated). A suitable filling material is, in particular, thermoset material mixed with wood fibers. During pouring-in of the material, the mold or the pressing tool lower part 201 already has a pre-heated temperature, wherein care must be taken to ensure that this temperature is not set so high that undesirable premature melting of the material occurs.

The screen 220 used for filling can have a predefined contour 222 which sets the throughput of the screen 220 so as to be uniform or variable. In this first step 110, a screen 220 having a uniform contour 222 is firstly used, so the filling material or mixture 221 is distributed uniformly on or in the mold of the pressing tool lower part 201. Once the material for this first layer 211 has been distributed or applied by shaking and/or rotating of the screen 220, the screen 220 is moved back toward the same side or direction D1 (in this case to the left) and removed from the mold.

Afterwards, in a step 120 (see also FIG. 3b), a pre-pressed molded part 212 is supplied from the other direction D2 or opposing side and inserted into the mold in the position provided. This molded part may, for example, comprise glued wood chips, in particular strands, which were pre-produced in an independent pressing method. It is also possible to pour not a pre-pressed molded part 210 but rather the material itself, i.e. for example glued strands, into the mold, in this case for the central layer 212. The use or the insertion of a pre-pressed molded part 210 has however the advantage that the contour of the central layer 212 is then already pre-produced and can, for example, have a precisely defined structure. For example, the strands can be oriented from the outset in a preferred direction corresponding to the anticipated main direction of loading. Alternatively, the pre-pressed molded part 210 itself can have a plurality of layers and/or regions comprising various structures and/or materials. Depending on the application, various molded parts 212 can be inserted, including for example pre-pressed OSB mats and the like. It is even possible for a plurality of (identical or different) molded parts to be inserted in succession (and preferably in alternation with layers comprising smaller particles). In the simplest case, only one molded part is inserted as the central layer.

Once the molded part 212 has been inserted, it then rests directly on the material of the lower layer 211. It should in this case be borne in mind that it is preferable for the material of the lower layer 211 completely to surround the edge of the inserted molded part 212, so the subsequent edges or rims of the composite molded part 210 contain exclusively the fine particles and are thus homogeneous, smooth and readily processable.

In a further step 130 (see also FIG. 3c), the material comprising the fine particles is again applied. This is carried out through a screen 220' which is likewise supplied from the direction D1 (i.e. in this case from the left). This screen 220' has in this case a non-uniform and pre-fixed contour having regions 222 with normal material throughput and regions 223 with increased material throughput. During the movement or the shaking of the screen 220', material is therefore applied in differing thickness, thus allowing the setting of partially differing layer or wall thicknesses and also the formation of the individual regions 203 where the material markedly accumulates and a defined thickening or elevation is formed.

Once finally the filling material or mixture for the upper layer 213 has also been applied, the screen 220' is moved back in the direction D1 (to the left) and removed from the mold.

Figure 4:
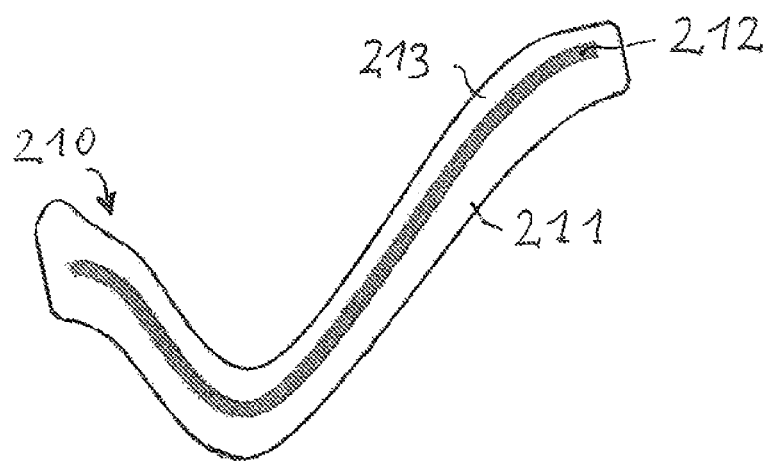
FIG. 4 is finally a schematic sectional drawing of the construction of the finished pressed multilayered composite molded part.

There then follows the concluding step 140 in which the pressing tool upper part (see 202 in FIG. 2) is moved from above toward the mold and compresses under the influence of pressure and heat the multilayered material structure which is introduced at this location. This then produces the desired multilayered composite molded part 210 such as is shown by way of example also in FIG. 4.

The upper mold or the pressing tool upper part 202 is preferably also pre-heated to a specific temperature, wherein both parts of the press, i.e. the upper part 202 and lower part 201, can have different temperature regulation means. In addition, steam can also be introduced into the mold during manufacture, such as was for example described in several of the Applicant's earlier applications.

The proposed method can be carried out in a highly efficient and quick manner partly because the screen is brought up from one side/direction D1 and the molded part is inserted from the opposing side/direction D2. In this case, the screens can be filled outside the actual mold or press. In particular, the screen 220' can be filled during the time in which the molded part is inserted.

The method can be adapted to various situations in a very flexible manner and can be modified for various product preferences. The manufactured product itself has, in particular, high strength but at the same time finely structured outer surfaces or layers and combines within it a very large number of advantages of the various conventional individual products.

LIST OF REFERENCE NUMERALS

100 Method for manufacturing a composite molded part (see 210 in FIG. 2, 4)
100 to 140 Individual method steps
200 Press comprising a pressing tool for manufacturing the composite molded part
201; 202 Lower part or upper part of the pressing tool
210 Composite molded part (multilayered, with pre-pressed molded part 212 on the inside)
211, 213 Lower or upper layer (outer layers) comprising fine particles
212 Central layer made up of the pre-pressed molded part comprising coarse particles
203 Recess in the upper part (for forming the local elevation/thickening)
204 Enclosure of the central layer by the two outer layers
220, 220' Screen (shaking screen) with contour
221 Filling means (indicated)
222, 223 Uniform or non-uniform contour
D1 Supply of the screen (from the left)
D2 Supply and insertion of the pre-pressed molded part (from the right)

What is claimed is:

1. A method for manufacturing a multilayered composite molded part in a pressing tool comprising a lower part and upper part, the composite molded part having a plurality of layers, a lower layer and an upper layer comprising particles provided with binder, wherein the layers surround a pre-pressed molded part which is inserted as a central layer, the inserted molded part having coarser particles than those of the lower and upper layers, the method comprising:

for the lower layer, particles provided with the binder are poured into a mold in the lower part of the pressing tool;
forming the upper layer;
the pre-pressed molded part, which has coarser particles than those of the lower and upper layers, is inserted into the first layer;
the layers are compressed together with the pre-pressed, inserted molded part under the influence of pressure and heat so as to form the multilayered composite molded part, via the inserted molded part corresponding to the lower layer by means of the upper part of the pressing tool which is guided onto the upper layer;
wherein the particles for the lower and upper layer are poured into the mold or onto the inserted molded part by a movable screen.

2. The method as claimed in claim 1, wherein the particles for the lower and upper layer contain fine chips or fibers and wherein the binder used is thermoset or else thermoplastic material.

3. The method of claim 1, wherein a mat which is pre-pressed from binders and large chips is inserted as the pre-pressed molded part.

4. The method of claim 1, wherein the screen is supplied and removed from a first side and wherein the molded part is supplied from another side.

5. The method of claim 1, wherein the binders and particles are poured in as a mixture via a filling means, the screen having contours by which a partially differing metering rate or layer thickness is set during filling.

6. The method of claim 1, wherein the lower part and the upper part of the pressing tool are operated at the same or different operating temperatures which in the range of from 155 to 175 degrees Celsius, the operating temperatures being regulated separately for the lower part and the upper part.

7. The method of claim 1, wherein the screen is shakable or rotatable.

8. The method of claim 4, wherein the another side is the opposing side.

9. The method of claim 1, wherein a mat which is pre-pressed from binders and OSB chips is inserted as the pre-pressed molded part.

10. The method of claim 1, wherein a mat which is pre-pressed from binders and strands is inserted as the pre-pressed molded part.

* * * * *